US012688728B2

(12) United States Patent
Yoo et al.

(10) Patent No.: US 12,688,728 B2
(45) Date of Patent: Jul. 21, 2026

(54) IMAGE PROCESSING DEVICE COMPRISING FACE SWAPPING FRAMEWORK, AND METHOD THEREFOR

(71) Applicant: Klleon Inc., Seoul (KR)

(72) Inventors: Sahng Min Yoo, Seongnam-si (KR); Tae Min Choi, Daejeon (KR); Jae Woo Choi, Daejeon (KR)

(73) Assignee: Klleon Inc., Seoul (KR)

( * ) Notice: Subject to any disclaimer, the term of this patent is extended or adjusted under 35 U.S.C. 154(b) by 89 days.

(21) Appl. No.: 18/868,834

(22) PCT Filed: Sep. 15, 2023

(86) PCT No.: PCT/KR2023/013856
§ 371 (c)(1),
(2) Date: Apr. 16, 2025

(87) PCT Pub. No.: WO2024/101635
PCT Pub. Date: May 16, 2024

(65) Prior Publication Data
US 2025/0391199 A1 Dec. 25, 2025

(30) Foreign Application Priority Data
Nov. 9, 2022 (KR) ........................ 10-2022-0148821

(51) Int. Cl.
*G06V 40/16* (2022.01)
*G06V 10/56* (2022.01)
(Continued)

(52) U.S. Cl.
CPC ........... *G06V 40/171* (2022.01); *G06V 10/56* (2022.01); *G06V 10/72* (2022.01);
(Continued)

(58) Field of Classification Search
None
See application file for complete search history.

(56) References Cited

U.S. PATENT DOCUMENTS

2020/0294294 A1* 9/2020 Petriv .................. G06N 3/0464

FOREIGN PATENT DOCUMENTS

KR 10-2022-0054955 5/2022

OTHER PUBLICATIONS

Wang et al ("Hififace: 3d shape and semantic prior guided high fidelity face swapping." arXiv preprint arXiv:2106.09965, 2021, pp. 1-10) (Year: 2021).*
(Continued)

*Primary Examiner* — Leon Viet Q Nguyen

(57) ABSTRACT
The present invention relates to an image processing device comprising a processor, which uses, when a source image and a target image are input, the source image and the target image so as to generate a face-conversion image, wherein the processor encodes the source image so as to extract an identity feature, encodes the target image so as to extract a target code, decodes the target code so as to extract a pose feature, and integrates the identify feature, the target code and the pose feature, and includes a face swapping framework, which uses an attribute image in which the size of the target image has been adjusted, so as to generate a face-conversion image in which an attribute feature of the target image is reflected.

4 Claims, 12 Drawing Sheets

(51) Int. Cl.

| | |
|---|---|
| *G06V 10/72* | (2022.01) |
| *G06V 10/77* | (2022.01) |
| *G06V 10/774* | (2022.01) |
| *G06V 10/82* | (2022.01) |
| *G06V 20/20* | (2022.01) |

(52) U.S. Cl.
CPC ...... *G06V 10/7715* (2022.01); *G06V 10/7747* (2022.01); *G06V 10/82* (2022.01); *G06V 20/20* (2022.01)

(56) References Cited

OTHER PUBLICATIONS

Li et al ("Faceshifter: Towards high fidelity and occlusion aware face swapping." arXiv preprint arXiv:1912.13457, 2019, pp. 1-11) (Year: 2019).*

International Search Report and the Written Opinion Dated Dec. 19, 2023 From the International Searching Authority Re. Application No. PCT/KR2023/013856 and Its Translation Into English. (18 Pages).

Notice of Allowance Dated Jul. 30, 2024 From the Korean Intellectual Property Office Re. Application No. 10-2022-0148821 and Its Translation Into English. (4 Pages).

Notice to Submit Response Dated Nov. 30, 2023 From the Korean Intellectual Property Office Re. Application No. 10-2022-0148821 and Its Translation Into English. (8 Pages).

Burkov et al. "Neural Head Reenactment With Latent Pose Descriptors", Proceedings of the IEEE/CVF Conference on Computer Vision and Pattern Recognition, CVPR, Seattle, WA, USA, Jun. 13-19, 2020, p. 13786-13795, Jun. 13, 2020.

Li et al. "FaceShifter: Towards High Fidelity And Occlusion Aware Face Swapping", ArXiv Preprint ArXiv:1912.13457v3, 11 P., Sep. 15, 2020.

Xu et al. "FaceController: Controllable Attribute Editing for Face in the Wild", ArXiv Preprint ArXiv:2102.11464v1, 10 P., Feb. 23, 2021.

* cited by examiner

Source       Target       DeepFakes

Source     Target     FSGAN     SimSwap     FaceShifter     Ours $X_s$ $X_t$ $X_{att}$ $\hat{Y}$ $X_s$          $X_t$          $X_{att}$          w/o D.A.          Ours

| Source | Target | *1\*1 ID* | *64\*64 Pose* | Ours |

IMAGE PROCESSING DEVICE COMPRISING FACE SWAPPING FRAMEWORK, AND METHOD THEREFOR

TECHNICAL FIELD

The present disclosure relates to an image processing device and a method therefor and, more particularly, to a face swapping framework capable of generating a face-conversion image having identity of a source image while maintaining the pose and attributes of a target image.

BACKGROUND ART

A deepfake model is a model that learns a source image and a target image based on a deep learning algorithm and generates a face-conversion image. FIG. 1 illustrates a face-conversion image generated by a conventional deepfake model. Referring to FIG. 1, the conventional deepfake model fails to maintain the identity of the source image and fails to properly mimic the pose and attributes of the target image. Meanwhile, the conventional deepfake model performs face conversion after learning a large amount of source images and target images, so expensive data collection costs and long-term learning are problematic.

NON-PATENT LITERATURE

[1] Volker Blanz and Thomas Vetter. A morphable model for the synthesis of 3d faces. In Proceedings of the 26th annual conference on Computer graphics and interactive techniques, pages 187-194, 1999.

[2] Adrian Bulat and Georgios Tzimiropoulos. How far are we from solving the 2d & 3d face alignment problem? (and a dataset of 230,000 3d facial landmarks). In Proceedings of the IEEE International Conference on Computer Vision, pages 1021-1030, 2017.

[3] Egor Burkov, Igor Pasechnik, Artur Grigorev, and Victor Lempitsky. Neural head reenactment with latent pose descriptors. In Proceedings of the IEEE/CVF Conference on Computer Vision and Pattern Recognition, pages 13786-13795, 2020.

[4] Renwang Chen, Xuanhong Chen, Bingbing Ni, and Yanhao Ge. Simswap: An efficient framework for high fidelity face swapping. In Proceedings of the 28th ACM International Conference on Multimedia, pages 2003-2011, 2020.

[5] J. S. Chung, A. Nagrani, and A. Zisserman. Voxceleb2: Deep speaker recognition. In INTERSPEECH, 2018.

[6] DeepFakes. Deepfakes github repository. https://github.com/deepfakes/faceswap, 2019. Accessed: 2021-11-28.

[7] Jiankang Deng, Jia Guo, Niannan Xue, and Stefanos Zafeiriou. Arcface: Additive angular margin loss for deep face recognition. In Proceedings of the IEEE/CVF Conference on Computer Vision and Pattern Recognition, pages 4690-4699, 2019.

[8] Ke Gong, Yiming Gao, Xiaodan Liang, Xiaohui Shen, Meng Wang, and Liang Lin. Graphonomy: Universal human parsing via graph transfer learning. In Proceedings of the IEEE/CVF Conference on Computer Vision and Pattern Recognition, pages 7450-7459, 2019.

[9] Sungjoo Ha, Martin Kersner, Beomsu Kim, Seokjun Seo, and Dongyoung Kim. Marionette: Few-shot face reenactment preserving identity of unseen targets. In Proceedings of the AAAI Conference on Artificial Intelligence, volume 34, pages 10893-10900, 2020.

[10] Martin Heusel, Hubert Ramsauer, Thomas Unterthiner, Bernhard Nessler, and Sepp Hochreiter. Gans trained by a two time-scale update rule converge to a local nash equilibrium. Advances in neural information processing systems, 30, 2017.

[11] Xun Huang and Serge Belongie. Arbitrary style transfer in real-time with adaptive instance normalization. In Proceedings of the IEEE International Conference on Computer Vision, pages 1501-1510, 2017.

[12] Justin Johnson, Alexandre Alahi, and Li Fei-Fei. Perceptual losses for real-time style transfer and super-resolution. In European conference on computer vision, pages 694-711. Springer, 2016.

[13] Lingzhi Li, Jianmin Bao, Hao Yang, Dong Chen, and Fang Wen. Faceshifter: Towards high fidelity and occlusion aware face swapping. arXiv preprint arXiv: 1912.13457, 2019.

[14] Lingzhi Li, Jianmin Bao, Hao Yang, Dong Chen, and Fang Wen. Advancing high fidelity identity swapping for forgery detection. In Proceedings of the IEEE/CVF Conference on Computer Vision and Pattern Recognition (CVPR), June 2020.

[15] Jae Hyun Lim and Jong Chul Ye. Geometric gan. arXiv preprint arXiv:1705.02894, 2017.

[16] Yuval Nirkin, Yosi Keller, and Tal Hassner. Fsgan: Subject agnostic face swapping and reenactment. In Proceedings of the IEEE/CVF international conference on computer vision, pages 7184-7193, 2019.

[17] Taesung Park, Ming-Yu Liu, Ting-Chun Wang, and Jun-Yan Zhu. Semantic image synthesis with spatially-adaptive normalization. In Proceedings of the IEEE/CVF Conference on Computer Vision and Pattern Recognition, pages 2337-2346, 2019.

[18] Ivan Perov, Daiheng Gao, Nikolay Chervoniy, Kunlin Liu, Sugasa Marangonda, Chris Ume, Mr Dpfks, Carl Shift Facenheim, Luis R P, Jian Jiang, et al. Deepfacelab: A simple, flexible and extensible face swapping framework. arXiv preprint arXiv: 2005.05535, 2020.

[19] Aliaksandr Siarohin, Stephane Lathuiliere, Sergey Tulyakov, Elisa Ricci, and Nicu Sebe. First order motion model for image animation. Advances in Neural Information Processing Systems, 32:7137-7147, 2019.

[20] Ting-Chun Wang, Arun Mallya, and Ming-Yu Liu. One-shot free-view neural talking-head synthesis for video conferencing. In Proceedings of the IEEE/CVF Conference on Computer Vision and Pattern Recognition, pages 10039-10049, 2021.

[21] Yuhan Wang, Xu Chen, Junwei Zhu, Wenqing Chu, Ying Tai, Chengjie Wang, Jilin Li, Yongjian Wu, Feiyue Huang, and Rongrong Ji. Hififace: 3d shape and semantic prior guided high fidelity face swapping. arXiv preprint arXiv:2106.09965, 2021.

[22] Olivia Wiles, A Koepke, and Andrew Zisserman. X2face: A network for controlling face generation using images, audio, and pose codes. In Proceedings of the European conference on computer vision (ECCV) pages 670-686, 2018.

[23] Guangming Yao, Yi Yuan, Tianjia Shao, Shuang Li, Shanqi Liu, Yong Liu, Mengmeng Wang, and Kun Zhou. One-shot face reenactment using appearance adaptive normalization. arXiv preprint arXiv: 2102.03984, 2021.

[24] Egor Zakharov, Aleksei Ivakhnenko, Aliaksandra Shysheya, and Victor Lempitsky. Fast bi-layer neural synthesis of one-shot realistic head avatars. In European Conference on Computer Vision, pages 524-540. Springer, 2020.

[25] Egor Zakharov, Aliaksandra Shysheya, Egor Burkov, and Victor Lempitsky. Few-shot adversarial learning of realistic neural talking head models. In Proceedings of the IEEE/CVF International Conference on Computer Vision, pages 9459-9468, 2019.

[26] Xianfang Zeng, Yusu Pan, Mengmeng Wang, Jiangning Zhang, and Yong Liu. Realistic face reenactment via self-supervised disentangling of identity and pose. In Proceedings of the AAAI Conference on Artificial Intelligence, volume 34, pages 12757-12764, 2020.

[27] Yunxuan Zhang, Siwei Zhang, Yue He, Cheng Li, Chen Change Loy, and Ziwei Liu. One-shot face reenactment. arXiv preprint arXiv:1908.03251, 2019.

DISCLOSURE

Technical Problem

An objective of the present disclosure is to provide a lightweight one-step face swapping framework capable of generating a face-conversion image having the identity of a source image while maintaining the pose and attributes of a target image.

Another objective of the present disclosure is to provide a face swapping framework capable of generating a face-conversion image in real time for various games, AR/VR, etc.

Technical Solution

The present disclosure provides an image processing device including a processor, which uses, when a source image and a target image are input, the source image and the target image so as to generate a face-conversion image, wherein the processor encodes the source image so as to extract an identity feature, encodes the target image so as to extract a target code, decodes the target code so as to extract a pose feature, and integrates the identify feature, the target code and the pose feature, and includes a face swapping framework which uses an attribute image in which a size of the target image has been adjusted so as to generate a face-conversion image in which an attribute feature of the target image is reflected.

The face swapping framework may include: an identity encoder configured to extract the identity feature; a pose network configured to extract the target code and the pose feature; and a triple adaptive normalization (TAN) decoder which takes the attribute image as an input and integrates the identity feature, the target code, and the pose feature so as to generate the face-conversion image.

The TAN decoder may include a plurality of TAN blocks.

Each of the plurality of TAN blocks may include: an identity integration block configured to produce an output value of an identity activation function corresponding to the identity feature; a spatial-adaptive pose integration block configured to produce an output value of a pose activation function corresponding to the pose feature; and a non-spatial-adaptive block configured to produce an output value of a code activation function corresponding to the target code.

The TAN block may include a spatial-adaptive branch and a non-spatial-adaptive branch in a parallel form, wherein the spatial-adaptive pose integration block and the identity integration block may be arranged in series in sequence in the spatial-adaptive branch, and the non-spatial-adaptive pose integration block may be arranged in the non-spatial-adaptive branch.

The processor may perform data augmentation by color distortion on the source image and the target image in a training phase of the face swapping framework.

In a training phase of the face swapping framework, the source image having an adjusted size may be input as the attribute image, and in a testing phase of the face swapping framework, the target image having an adjusted size may be input as the attribute image.

Advantageous Effects

According to the present disclosure, it is possible to provide a lightweight one-step face swapping framework capable of generating a face-conversion image having the identity of a source image while maintaining the pose and attributes of a target image.

According to the present disclosure, it is possible to provide a face swapping framework capable of generating a face-conversion image in real time for various games, AR/VR, etc.

DESCRIPTION OF THE REFERENCE NUMERALS IN THE DRAWINGS

200: Face swapping framework
210: Identity encoder
220: Pose network

230: Decoder
231: Adaptive normalization block
231$a$: Spatial-adaptive pose integration block
231$b$: Non-spatial-adaptive pose integration block
231$c$: Identity integration block

MODE FOR INVENTION

Hereinafter, the present disclosure will be described in detail. However, the present disclosure is not limited to these illustrative embodiments. The purpose and effect of the present disclosure may be naturally understood or made clearer by the following description, and the purpose and effect of the present disclosure are not limited by the description below alone. In addition, in describing the present disclosure, when it is determined that a detailed description of the publicly known technology related to the present disclosure may unnecessarily obscure the main point of the present disclosure, the detailed description will be omitted.

Identity, pose, and attribute referred to in this specification mean the following.

Identity: Unique appearance of a person.

Pose: Facial expression and degree of facial (head or neck) rotation.

Attribute: A characteristic of a scene in an image. Represented by color characteristics. Examples of color characteristics include skin color, makeup shade, and lighting conditions, etc.

A face-swapping framework of the present disclosure, which is a lightweight one-stage framework, may generate a face-conversion image in real time without any additional network or processing through a novel decoder structure, data augmentation, and switch-test strategy.

Figure 1:
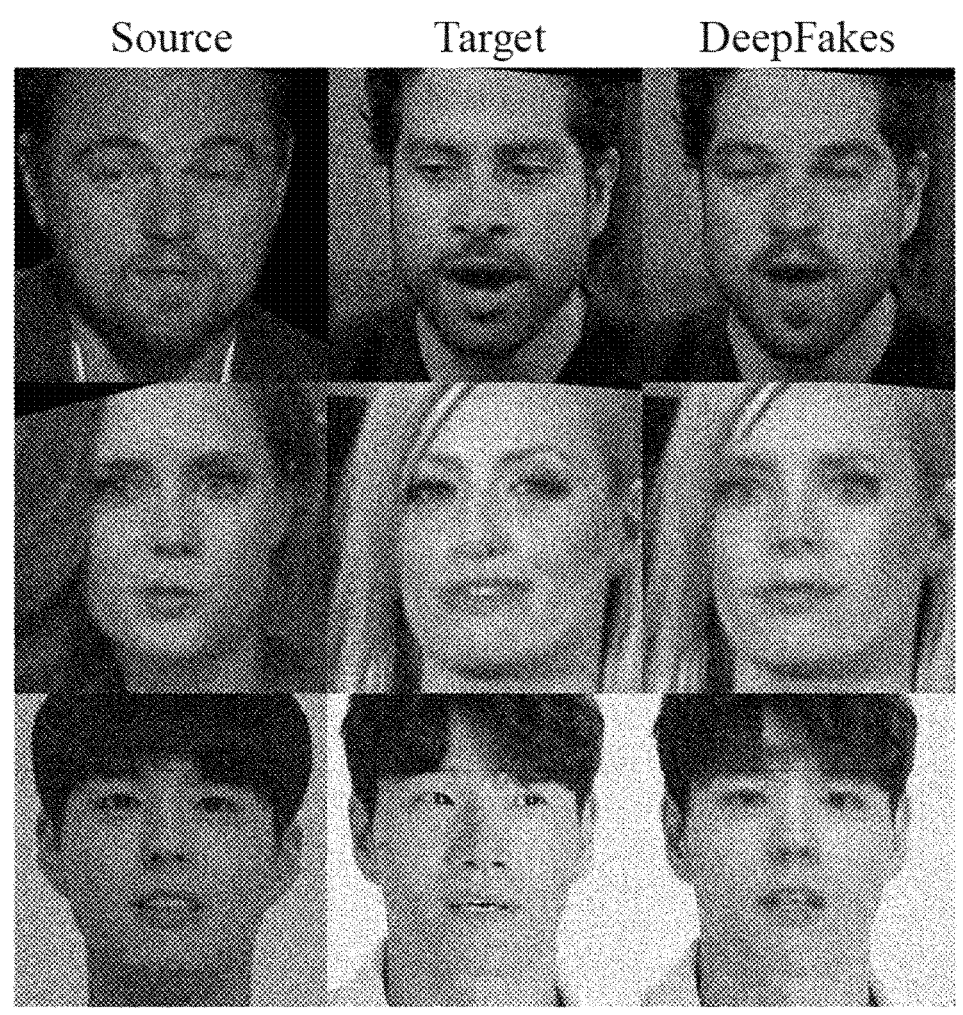
FIG. 1 illustrates a face-conversion image generated by a conventional deepfake model.
Figure 2:
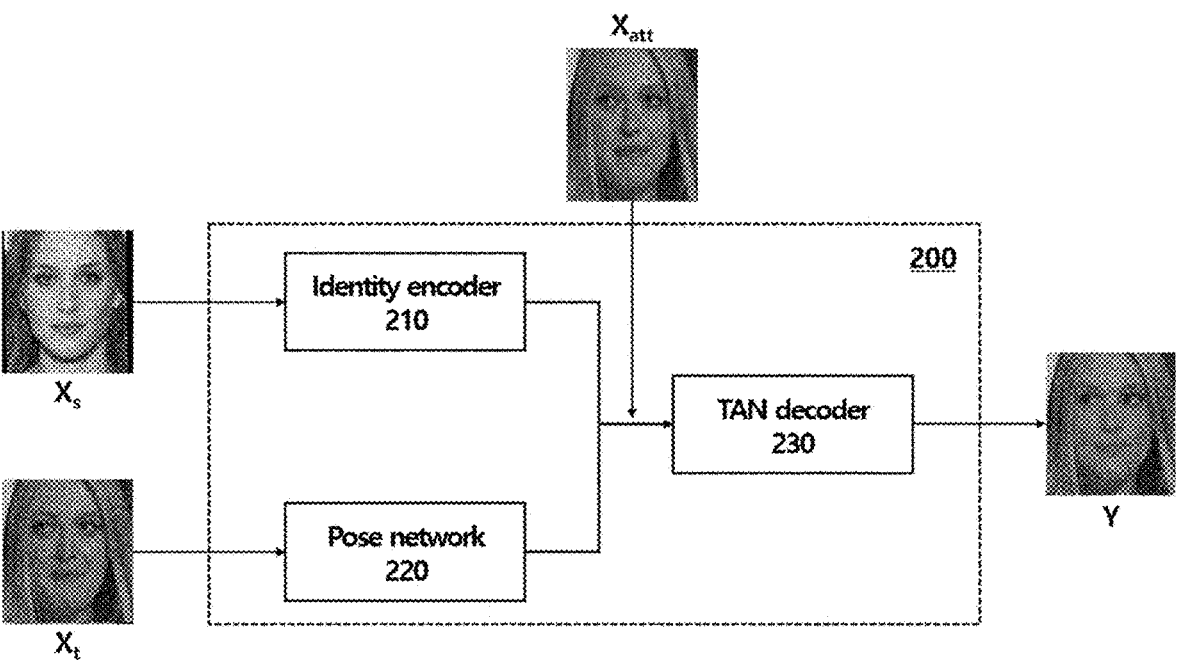
FIG. 2 illustrates a schematic configuration of a face swapping framework according to an embodiment of the present disclosure.

FIG. 2 illustrates a schematic configuration of a face swapping framework according to an embodiment of the present disclosure. Referring to FIG. 2, the face swapping framework 200 takes a source image $X_s$ and a target image $X_t$ as inputs and generates and outputs a face-conversion image Y. Here, the face-conversion image Y refers to an image in which the identity of a person in the target image $X_t$ is converted to the identity of a person in the source image $X_s$ while maintaining the pose and attributes of the target image $X_t$.

When the face swapping framework 200 takes a source image $X_s$ and a target image $X_t$ as inputs to generate a face-conversion image Y, the face swapping framework 200 additionally takes an attribute image $X_{att}$ as an input. The attribute image $X_{att}$, which is an image for extracting the attributes of the target image $X_t$, may be an image that has been resized from the source image $X_s$ or the target image $X_t$. More specifically, in the training phase, an image having the adjusted size of the source image $X_s$ may be input as the attribute image $X_{att}$, and in a testing phase, an image having the adjusted size of the target image $X_t$ may be input as the attribute image $X_{att}$.

Figure 3:
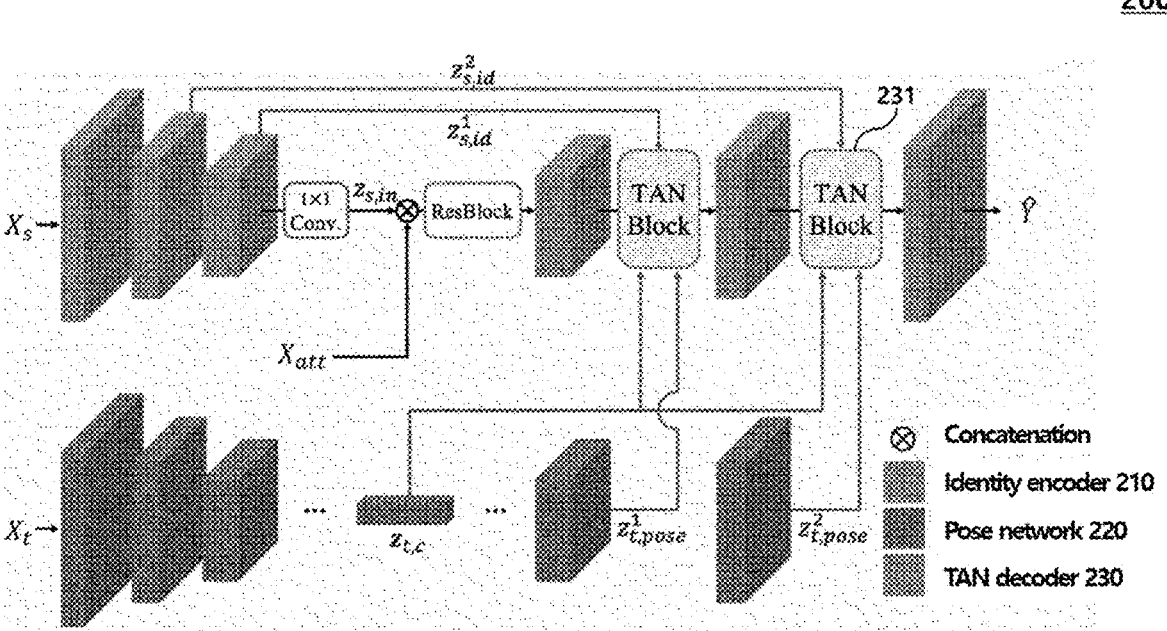
FIG. 3 illustrates a detailed configuration of a face swapping framework according to an embodiment of the present disclosure.

The following will be described with reference to FIGS. 2 and 3. FIG. 3 illustrates a detailed configuration of a face swapping framework according to an embodiment of the present disclosure. Referring to FIGS. 2 and 3, the face swapping framework 200 includes an identity encoder 210 that extracts identity features $$z^1_{s,id} \text{ and } z^2_{s,id}$$

from the source image $X_s$, a pose network 220 that encodes the target image $X_t$ into a target code $z_{t,c}$ and decodes the target code $z_{t,c}$ to extract pose features $$z^1_{t,pose} \text{ and } z^2_{t,pose'},$$

and a TAN decoder 230 that generates the face-conversion image Y based on the identity features $$z^1_{s,id} \text{ and } z^2_{s,id}$$

and the pose features $$z^1_{t,pose} \text{ and } z^2_{t,pose},$$

etc. The TAN decoder 230 refers to a decoder that performs three adaptive normalizations, and the meaning of "TAN" will be described later.

The identity encoder 210 includes a downsampling block that extracts the first and second identity features $$z^1_{s,id} \text{ and } z^2_{s,id}$$

from the source image $X_s$, and a convolution layer that extracts an identity feature input value $z_{s,in}$ from the first identity feature $$z^1_{s,id}.$$

More specifically, the identity encoder 210 extracts the first identity feature $$z^1_{s,id}$$

which has horizontal and vertical dimensions one-quarter those of the source image $X_s$ by using two downsampling blocks, and extracts the second identity feature $$z^2_{s,id}$$

as an intermediate output value. The identity encoder 210 obtains the identity feature input value $z_{s,in}$ which is input as an input value to the TAN decoder 230 from the first identity feature $$z^1_{s,id}$$

by using a 1×1 convolution layer. The first and second identity features $$z_{s,id}^1$$

and $$z_{s,id}^2$$

and the identity feature input value $z_{s,in}$ are input to the TAN decoder 230.

In an embodiment of the present disclosure, it is described that the identity encoder 210 extracts two identity features $$z_{s,id}^1 \text{ and } z_{s,id}^2$$

from two downsampling blocks, but three or more identity features may be extracted by using three or more downsampling blocks. However, since each of the identity features extracted by the identity encoder 210 is input to each of the adaptive normalization blocks 231 of the TAN decoder 230, it is considered that as the number of the downsampling blocks included in the identity encoder 210 increases, the number of the adaptive normalization blocks 231 of the TAN decoder 230 also increases.

The pose network 220 has an encoder-decoder structure. To prevent spatial identity information from being extracted from the target image $X_t$, the pose network 220 encodes the target image $X_t$ into a low-dimensional bottleneck target code $z_{t,c}$, $z_{t,c} \in R^{C \times 1 \times 1}$, and decodes the target code $z_{t,c}$ to extract first and second pose features $$z_{t,pose}^1 \text{ and } z_{t,pose}^2.$$

The target code $z_{t,c}$ and the first and second pose features $$z_{t,pose}^1 \text{ and } z_{t,pose}^2$$

are input to the TAN decoder 230. Here, the number of the pose features extracted by the pose network 220 is equal to the number of the adaptive normalization blocks 231 included in the TAN decoder 230. When the pose network 220 extracts two pose features, the TAN decoder 230 includes two adaptive normalization blocks 231. In summary, the number of the pose features extracted by the pose network 220, the number of the adaptive normalization blocks 231 included in the TAN decoder 230, and the number of the identity features extracted by the identity encoder 210 described above are the same.

The TAN decoder 230 includes a residual block (Res-Block) and two adaptive normalization blocks (TAN blocks) 231. The TAN decoder 230 integrates the identity feature input value $z_{s,in}$, the first and second identity features $$z_{s,id}^1 \text{ and } z_{s,id}^2,$$

the target code $z_{t,c}$, and the first and second pose features $$z_{t,pose}^1 \text{ and } z_{t,pose}^2$$

to generate the face-conversion image Y.

The residual block (ResBlock) has a structure that connects the output terminal of the identity encoder 210 and the input terminal of the TAN decoder 230, and receives the result of concatenating the identity feature input value $z_{s,in}$ and an attribute feature of the attribute image $X_{att}$ to be described later.

The adaptive normalization block 231 performs three adaptive normalizations considering the dimension of each feature to guide the combination of identity and pose. The adaptive normalization block 231 may be named a "TAN (triple adaptive normalization) block" since the adaptive normalization block performs three adaptive normalizations. Although only two adaptive normalization blocks 231 are illustrated in FIG. 3, the number of the adaptive normalization blocks 231 is not limited thereto, and the TAN decoder 230 may include three or more adaptive normalization blocks 231.

Figure 4:
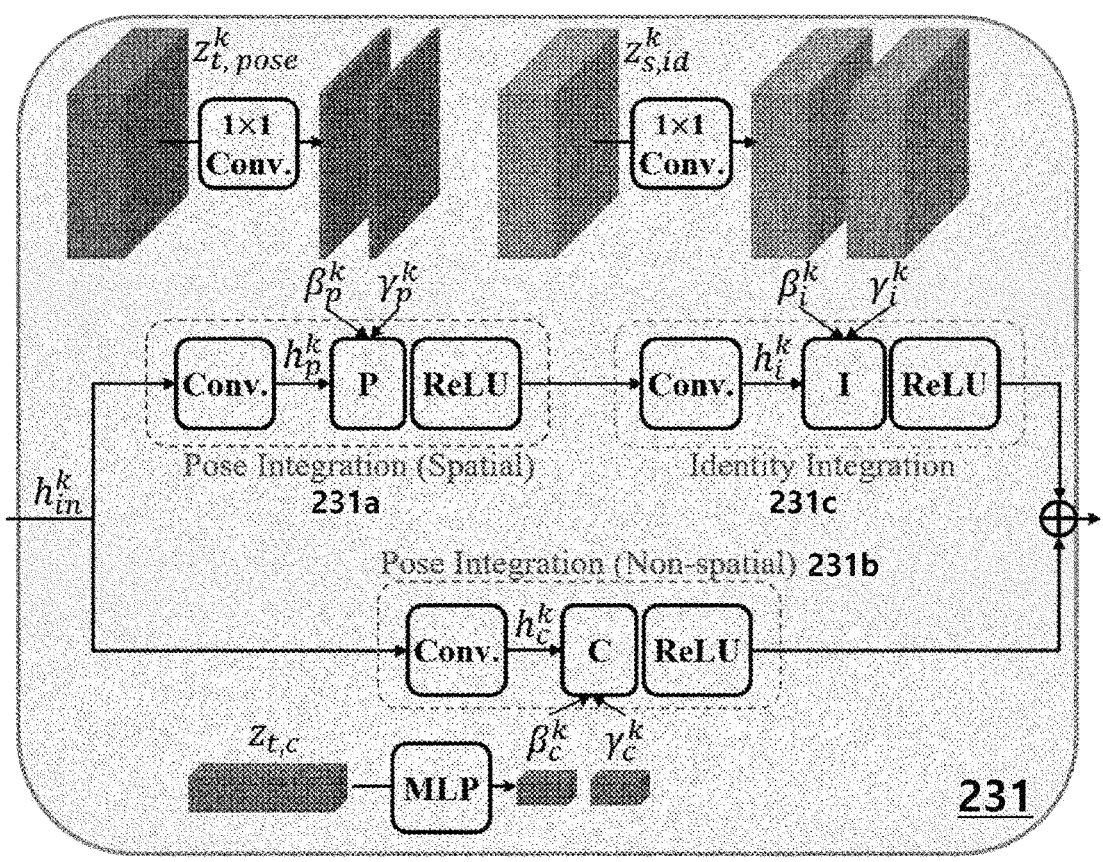
FIG. 4 illustrates a configuration of an adaptive normalization block according to an embodiment of the present disclosure.

FIG. 4 illustrates a configuration of an adaptive normalization block according to an embodiment of the present disclosure. Referring to FIG. 4, the adaptive normalization block 231 has two branches in parallel form, and combines spatial-adaptive parameters from a k-th identity feature $$z_{s,id}^k$$

and a k-th pose feature $$z_{t,pose}^k$$

with non-spatial-adaptive parameters from the target code $z_{t,c}$. One of the two branches is a spatial-adaptive branch, and the other branch is a non-spatial-adaptive branch. Since an identity input feature $z_{s,in}$ is used as an input value of the decoder, a spatial pose integration block 231a and a non-spatial pose integration block 231c are disposed in a spatial-adaptive branch and a non-spatial-adaptive branch, respectively, and an identity integration block 231c is disposed behind the spatial pose integration block 231a. In other words, two adaptations are applied in the order of pose integration and identity integration in the spatial-adaptive branch, and non-spatial pose integration is applied in the non-spatial-adaptive branch.

The adaptive normalization block 231 performs three different adaptive normalizations of an activation map by using a corresponding parameter generated from each of the following input values.

1) Spatial pose integration:

$$z_{t,pose}^k$$

2) Identity integration:

$$z_{s,id}^k$$

3) Non-spatial pose integration: $z_{t,c}$ $$h_p^k, h_i^k, \text{ and } h_c^k \left( \in R^{C_k \times H_k \times W_k} \right)$$

are input to adaptive normalizations of a k-th adaptive normalization block 231. Here, $C_k$ is the number of channels and $H_k \times W_k$ is a spatial dimension.

The spatial-adaptive pose integration block 231$a$ includes a 1×1 convolution layer, a pose activation function P, and an ReLU activation function. The pose activation function P denormalizes the normalized $$\overline{h}_p^k$$

by using 2D adaptive parameters generated from a k-th pose feature $$\hat{z}_{t,pose}^k.$$

$$\overline{h}_p^k$$

and the pose activation function P are as shown in [Mathematical formula 1].

$$\overline{h}_p^k = \frac{h_p^k - \mu_p^k}{\sigma_p^k} P(h_p^k) = \gamma_p^k \odot \overline{h}_p^k + \beta_p^k \qquad \text{[Mathematical formula 1]}$$

Here, $$\mu_p^k \text{ and } \sigma_p^k \left( \in R^{1 \times H_k \times W_k} \right)$$

are the mean and standard deviation of $$h_p^k$$

for HW-wise activation, $$\beta_p^k \text{ and } \gamma_p^k \left( \in R^{1 \times H_k \times W_k} \right)$$

are modulation parameters convolved from the k-th pose feature $$\hat{z}_{t,pose}^k,$$

and $\odot$ is element-wise multiplication.

The identity integration block 231$c$ includes a 1×1 convolution layer, an identity activation function I, and an ReLU activation function. The identity activation function I denormalizes the normalized $$\overline{h}_i^k$$

according to a k-th identity feature $$\hat{z}_{s,id}^k.$$

$$\overline{h}_i^k$$

and the identity activation function I are as shown in [Mathematical formula 2].

$$\overline{h}_i^k = \frac{h_i^k - \mu_i^k}{\sigma_i^k} I(h_i^k) = \gamma_i^k \odot \overline{h}_i^k + \beta_i^k \qquad \text{[Mathematical formula 2]}$$

Here, $$\mu_i^k \text{ and } \sigma_i^k \left( \in R^{C_k \times H_k \times W_k} \right)$$

are the mean and standard deviation of $$h_i^k$$

for CHW-wise activation, $$\beta_i^k \text{ and } \gamma_i^k \left( \in R^{C_k \times H_k \times W_k} \right)$$

are modulation parameters convolved from the k-th identity feature $$\hat{z}_{s,id}^k,$$

and $\odot$ is element-wise multiplication.

The non-spatial-adaptive pose integration block 231$b$ includes a 1×1 convolution layer, a code activation function C, and an ReLU activation function. The code activation function C denormalizes the normalized $$\overline{h}_c^k$$

according to the target code $z_{t,c}$.

$$\overline{h}_c^k$$

11 and a fifth activation function C are as shown in [Mathematical formula 3].

$$\overline{h}_c^k = \frac{h_c^k - \mu_c^k}{\sigma_c^k} \; C(h_c^k) = \gamma_c^k \odot \overline{h}_c^k + \beta_c^k \qquad \text{[Mathematical formula 3]}$$

Here, $$\mu_c^k \text{ and } \sigma_c^k \big( \in R^{C_k \times 1 \times 1} \big)$$

are the mean and standard deviation of $$h_c^k$$

for C-wise activation, and $$\beta^k \text{ and } \gamma^k \big( \in R^{C_k \times 1 \times 1} \big)$$

are modulation parameters learned by a multi-layer perceptron (MLP) that takes a flattened target code $z_{t,c}$ as an input value.

The integration of the k-th pose feature $$z_{t,pose}^k,$$

the k-th identity feature $$z_{s,id}^k,$$

and the target code $z_{t,c}$ in the k-th adaptive normalization block 231 is performed based on [Mathematical formula 4] through the pose activation function P, the identity activation function I, and the code activation function C which are computed through [Mathematical formula 1], [Mathematical formula 2], and [Mathematical formula 3] described above.

$$TAN^k\big(h_{in}^k, z_{s,id}^k, z_{t,c}, z_{t,pose}^k\big) = \qquad \text{[Mathematical formula 4]}$$

$$I\big(Conv\big(P\big(Conv\big(h_{in}^k\big)\big)\big)\big) + C\big(Conv\big(h_{in}^k\big)\big)$$

Here, $$h_{in}^k$$

is an input value of the k-th adaptive normalization block 231.

According to an embodiment of the present disclosure, data augmentation and switch-test strategy in the training phase and the testing phase of the face swapping framework 200 will be described. Hereinafter, for convenience of explanation, the face swapping framework 200 of the present disclosure is referred to as "the framework of the present disclosure".

Data augmentation facilitates the framework of the present disclosure to extract identity information from the source image $X_s$, pose information from the target image $X_t$, and attribute information from the attribute image $X_{att}$. According to the present disclosure, the characteristic of color distortion is used for data augmentation.

Figure 5:
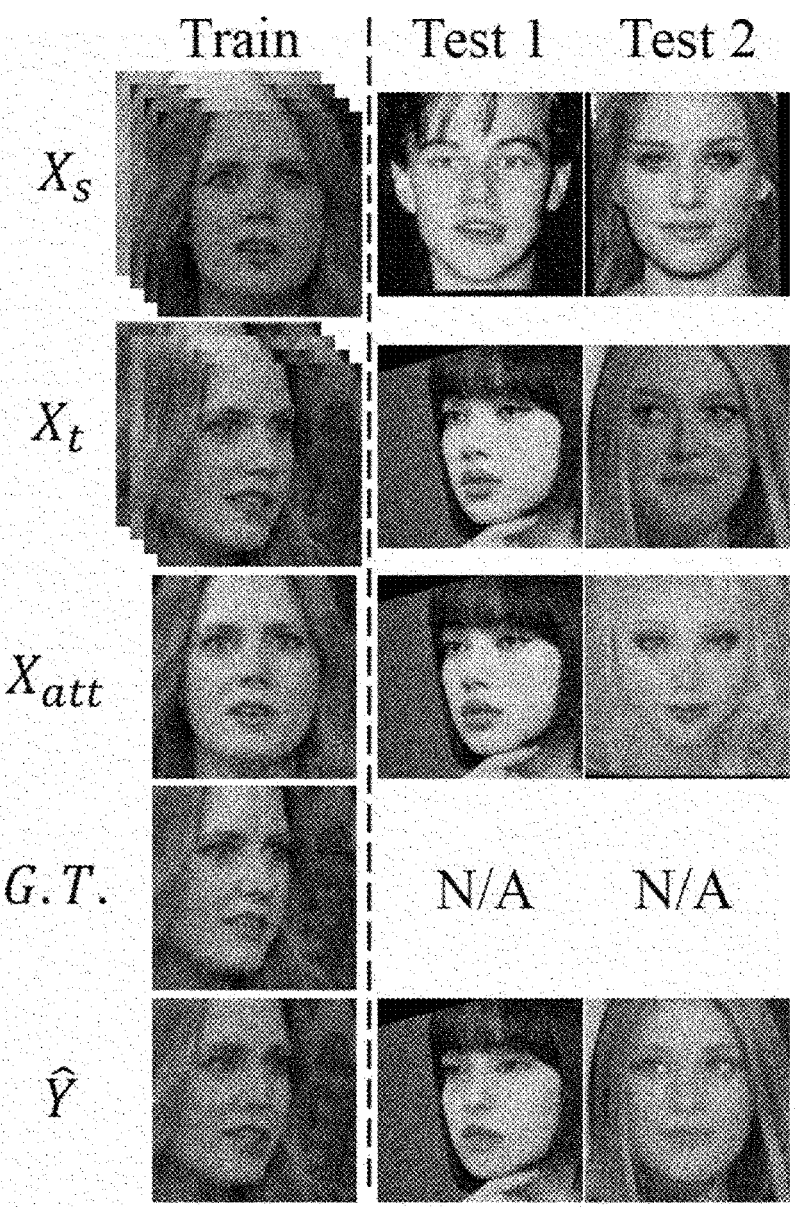
FIG. 5 illustrates each of an example of an attribute image input in a training phase and an example of an attribute image input in a testing phase.

FIG. 5 illustrates each of an example of an attribute image input in a training phase and an example of an attribute image input in a testing phase. Referring to the first column (Train) of FIG. 5, the framework of the present disclosure performs different color distortion augmentation on each of the source image $X_s$ and the target image $X_t$. This is because identity information and pose information are not damaged by color distortion. On the other hand, attribute information is sensitive to color changes. As a result, the attribute image $X_{att}$ and a ground truth G.T. retains their original colors, so attributes are extracted from the attribute image $X_{att}$.

In the face conversion task, a switch-test strategy that considers a task interval between the training phase and the testing phase is described. The source image $X_s$ and the target image $X_t$ have the same attributes in the training phase, but different attributes are used in the testing phase. When the testing phase is considered, the target image $X_t$ is preferably used as the attribute image $X_{att}$, but such input is allowed only when correct answer information is provided as an input value. Therefore, the present disclosure uses self-supervised learning based on the fact that the attributes of the attribute image $X_s$ and the target image $X_t$ are identical in the training phase.

According to the present disclosure, in the training phase, the source image having an adjusted size while maintaining an original color is set as the attribute image $X_{att}$, and in the testing phase, as shown in the second column (Test 1) of FIG. 5, the target image having an adjusted size is converted to the attribute image $X_{att}$ to reconstruct the attributes of the target image $X_t$. Furthermore, according to the present disclosure, as shown in the third column (Test 2) of FIG. 5, various outputs with desired attributes may be generated by inputting and adjusting an independent attribute image $X_{att}$.

The framework of the present disclosure combines five loss functions for learning. According to the present disclosure, the L-2 reconstruction loss $L_{rec}$ between a face-conversion image which is an output value and a correct answer information, and the VGG-19-based perceptual loss [12] $L_{per}$ are defined. Next, image quality is improved through adversarial learning using a discriminator. The discriminator is trained via an adversarial loss function $$L_{adv}^D,$$

and the framework of the present disclosure, which corresponds to a generator, is trained via an adversarial loss function $$L_{adv}^G.$$

A multi-scale discriminator [17] is used, and each original binary cross entropy loss function is replaced by a hinge loss function [15].

According to the present disclosure, to preserve the identity feature of the source image $X_s$ and the pose feature of the target image $X_t$, an identity preservation loss function $L_{id}$ and a pose reconstruction loss function $L_{pose}$ are used. The identity preservation loss function $L_{id}$ is computed as the cosine similarity of the identity feature from Arcface [7] between the face-conversion image Y and the source image $X_s$. The pose reconstruction loss $L_{pose}$ refers to an L-2 distance between the target code $z_{t,c}$ and a target-like code $\hat{z}_c$. Here, the target-like code $\hat{z}_c$ refers to a target code reconstructed by inputting the face-conversion image Y into the encoder of the pose network 220. Since the face-conversion image Y has the same pose as the target image $X_t$, the target-like code $\hat{z}_c$ is close to the target code $z_{t,c}$. The framework of the present disclosure is trained so that the weighted sum of the loss function described above is minimized through [Mathematical formula 5].

$$L_{rec}(\hat{Y}, G.T.) + \lambda_{per}L_{per}(\hat{Y}, G.T.) + \quad \text{[Mathematical formula 5]}$$
$$\lambda_{adv}L_{adv}^G(\hat{Y}, G.T.) + \lambda_{id}L_{id}(\hat{Y}, X_s) +$$
$$\lambda_{pose}L_{pose}(z_{t,c}, \hat{z}_c) \text{ with } \lambda_{per} = \lambda_{adv} = 1,$$
$$\lambda_{id} = 0.1, \text{ and } \lambda_{pose} = 10.$$

The framework of the present disclosure is trained on a large-scale face dataset Vox-Celeb2 [5]. The source image $X_s$ and the target image $X_t$ are images of faces cropped and aligned to a size of 256×256 from the face dataset. In the identity encoder 210 and the adaptive normalization block 231, the number of layers is set to 2. The pose network 220 downsamples pose features eight times. Accordingly, the respective results are as follows.

$$z_{s,in} \in R^{128 \times 64 \times 64}, z_{t,c} \in R^{128 \times 1 \times 1}$$

According to the present disclosure, the efficiency of a conversion process and the validity of a result are compared by using various evaluation indicators. The detailed explanation is as follows.

1) FPS (Frames per second): This indicates a conversion speed measured in a typical environment with one RTX2080Ti GPU.
2) MACs (Multiply-accumulate operations): This measures computational complexity.
3) Param.: This indicates the number of parameters for each framework.
4) ID (Identity similarity) This refers to cosine similarity Arcface [7] embedding vectors from a face-conversion image and the source image, which evaluates identity matching.
5) Pose: This refers to a normalized average error of head pose by using 68 landmarks [2] of a face-conversion image (synthetic image) and a target image.
6) FID (Frechet-inception distance) [10]: This measures perceptual realism calculated based on a target image as correct answer information.

For quantitative comparison, 118 videos are sampled from a VoxCeleb2 test set (one video for each individual) and 10 source faces evenly distributed according to gender and race are converted.

Table 1 shows the results of comparison with a conventional neural talking head framework and the face swapping framework, divided into two sections. More specifically, Table 1 shows quantitative comparison results based on evaluation indicators. In Table 1, an arrow ↑ means that a higher value indicates better performance, and an arrow ↓ means the opposite. The best performance is indicated in bold, and the second best performance is indicated by an underline.

TABLE 1

| Method | FPS↑ | MACs↓ | Param.↓ | ID↑ | Pose↓ | FID↓ |
|---|---|---|---|---|---|---|
| FOMM | 41.64 | 56.24G | 73.98M | 0.65 | 0.88 | 138.29 |
| LPD | <u>57.81</u> | <u>30.81G</u> | <u>40.07M</u> | <u>0.68</u> | <u>0.96</u> | 138.45 |
| OSFV | 10.97 | 384.65G | 195.08M | 0.66 | 1.01 | 143.57 |
| Ours-M | 123.22 | 14.34G | 26.50M | 0.70 | 0.71 | 90.63 |
| FSGAN | 6.62 | 846.84G | 226.36M | 0.38 | 0.57 | 88.52 |
| SimSwap | <u>24.48</u> | <u>55.79G</u> | 107.24M | <u>0.48</u> | 0.66 | 77.46 |
| FaceShifter | 17.36 | 81.58G | 418.75M | 0.44 | 0.70 | 42.40 |
| Ours | 123.22 | 14.34G | 26.50M | 0.54 | <u>0.61</u> | <u>60.08</u> |

The framework of the present disclosure converts faces at the fastest speed with the fewest parameters and computational cost, as shown in the results of FPS, MACs and Param. MACs and Param. of LPD are relatively comparable to those of the framework of the present disclosure but require some fine-tuning processes. Since FaceShifter focuses on preserving unexpected attributes, FaceShifter has the lowest FID score computed with a target image. FSGAN shows the lowest pose because it tends to maintain the shape and size of the eyes, nose, and mouth of a target image while missing the identity of a source image. However, the framework of the present disclosure maintains the identity of the source and the pose of the target in high quality when considering the ID, Pose, and FID values as a whole. The framework of the present disclosure has a clear advantage in terms of a conversion speed, since the framework of the present disclosure shows the conversion speed that is 7 times faster than FaceShifter.

Figure 6:
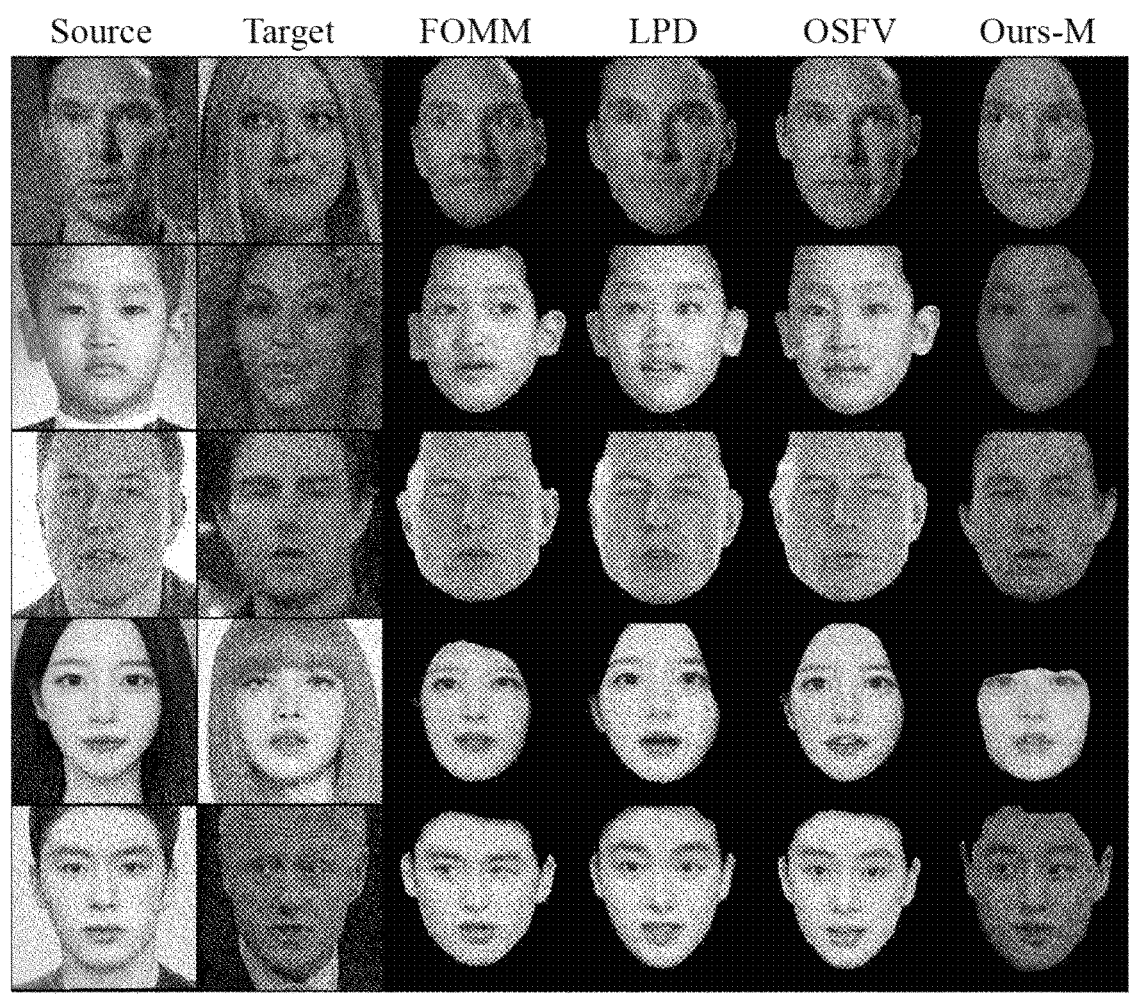
FIG. 6 illustrates the conversion results of latest neural talking head frameworks such as FOMM [19], LPD [3], and OSFV [20] and the framework of the present disclosure.

FIG. 6 illustrates the conversion results of latest neural talking head frameworks such as FOMM [19], LPD [3], and OSFV [20] and the framework of the present disclosure. In FIG. 6, backgrounds except faces are masked for easy comparison. The neural talking head frameworks described above follow the background and attributes of the source image, whereas the framework of the present disclosure follow the background and attributes of the target image. Since the aforementioned neural talking head frameworks follow different backgrounds, the resulting background of each of the frameworks is masked by using Graphonomy [8]. Since skin color vary depending on attributes, comparing identities at a glance is challenging. However, the framework of the present disclosure preserves the identity of a source face better when viewing facial elements individually. Additionally, the framework of the present disclosure best reconstructs target poses when looking at eye movements or mouth shapes. Referring to row 3 of FIG. 6, the framework of the present disclosure determines target poses even for a low-fidelity input.

Figure 7:
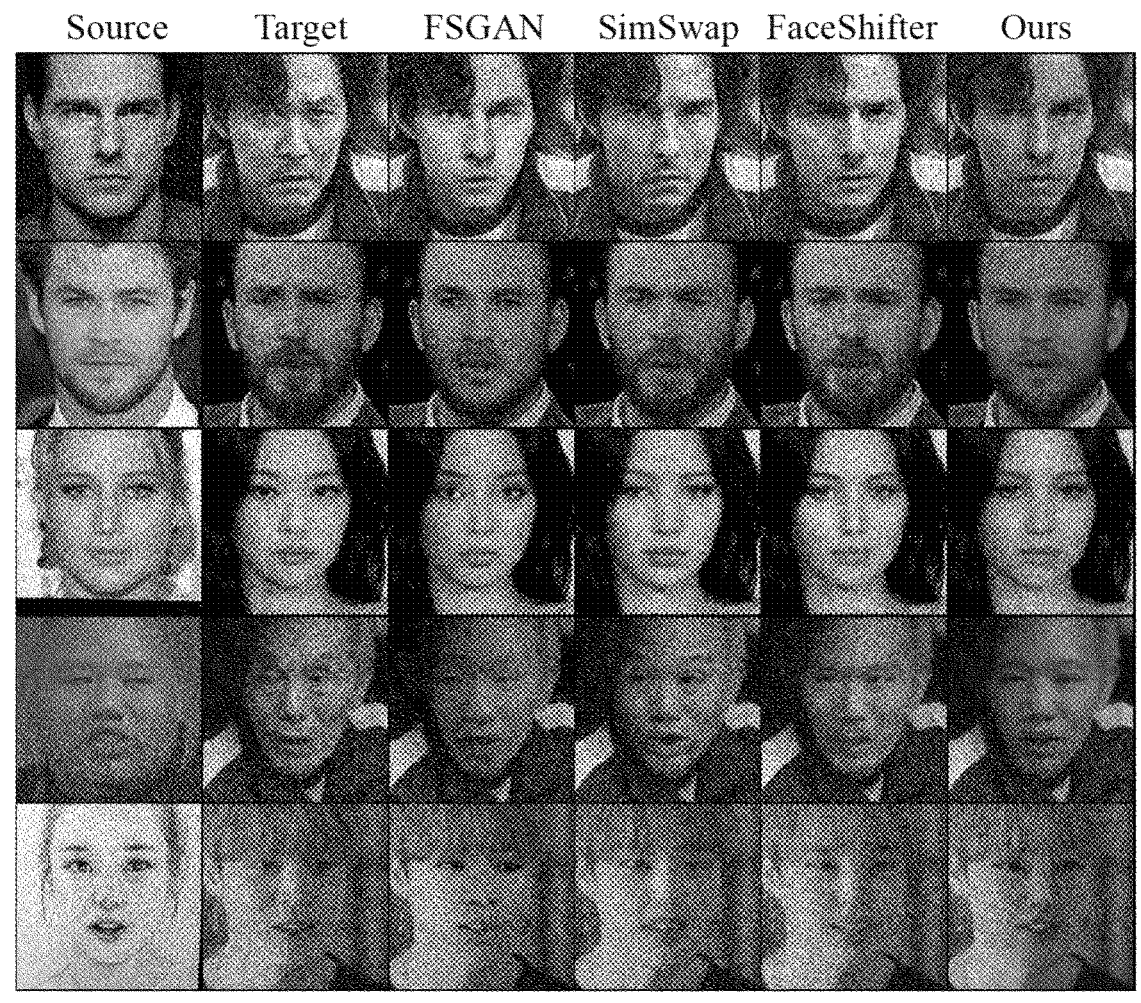
FIG. 7 illustrates the conversion results of latest face swapping frameworks such as FSGAN [16], SimSwap [4], and FaceShifter [14] and the framework of the present disclosure.

FIG. 7 illustrates the conversion results of latest face swapping frameworks such as FSGAN [16], SimSwap [4], and FaceShifter [14] and the framework of the present disclosure. The framework of the present disclosure best reenacts the pose of a target image based on the movements of eye, pupil, and lip. Moreover, the framework of the present disclosure not only replaces source faces without losing their identity, but also applies plausible attributes to produce photo-realistic results. While unexpected attributes such as scars are applied relatively clearly in SimSwap and FaceShifter (see row 1), the framework of the present disclosure focuses on preserving a source identity, including beards (see row 2), wrinkles (see row 4), and spots (see row 5). Referring to row 5 of FIG. 7, it can be seen that the framework of the present disclosure extracts identity and pose from an input image even when a source image is a cartoon or drawing.

While the aforementioned experiments focus on a face conversion task using only two image inputs by inserting a target image into an attribute image $X_{att}$, the framework of the present disclosure may separately edit resulting attributes by using additional images with the desired attributes.

Figure 8:
FIG. 8 illustrates the conversion results of the framework of the present disclosure when various attribute images are used.

FIG. 8 illustrates the conversion results of the framework of the present disclosure when various attribute images are used. More specifically, the results of FIG. 8 are illustrated by replacing the attribute image $X_{att}$ with several different images while keeping the source image $X_s$ and the target image $X_t$, which are input images, the same. Referring to FIG. 8, the framework of the present disclosure follows the attributes of the attribute image $X_{att}$ while maintaining same identity and pose, especially the lip makeup and skin color.

Figure 9:
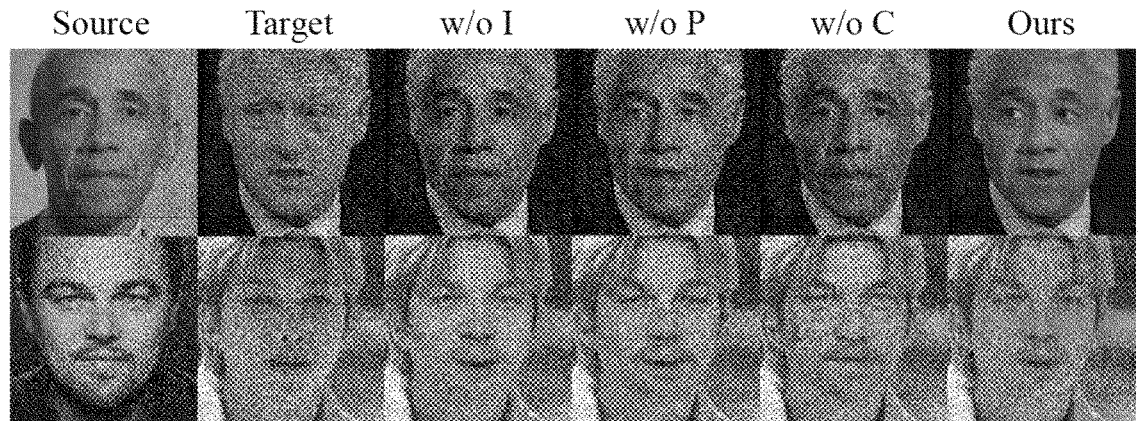
FIG. 9 is a view to explain the effect of the adaptive normalization block of the framework of the present disclosure.

FIG. 9 is a view to explain the effect of the adaptive normalization block of the framework of the present disclosure. In FIG. 9, (a) illustrates a source image $X_s$, (b) illustrates a target image $X_t$, (c), (d) and (e) respectively illustrate the face-conversion images of (ablation) models without the identity activation function I, the pose activation function P, and the code activation function C, and (f) illustrates the face-conversion image of the face swapping framework according to an embodiment of the present disclosure. It can be seen that the identity activation function I improves the resolution of the output and integrates the detailed identity of the source image $X_s$, the pose activation function P mainly affects detailed poses such as the reenactment of eyes and lips, and the code activation function C reconstructs the general pose of the target image $X_t$.

Figure 10:
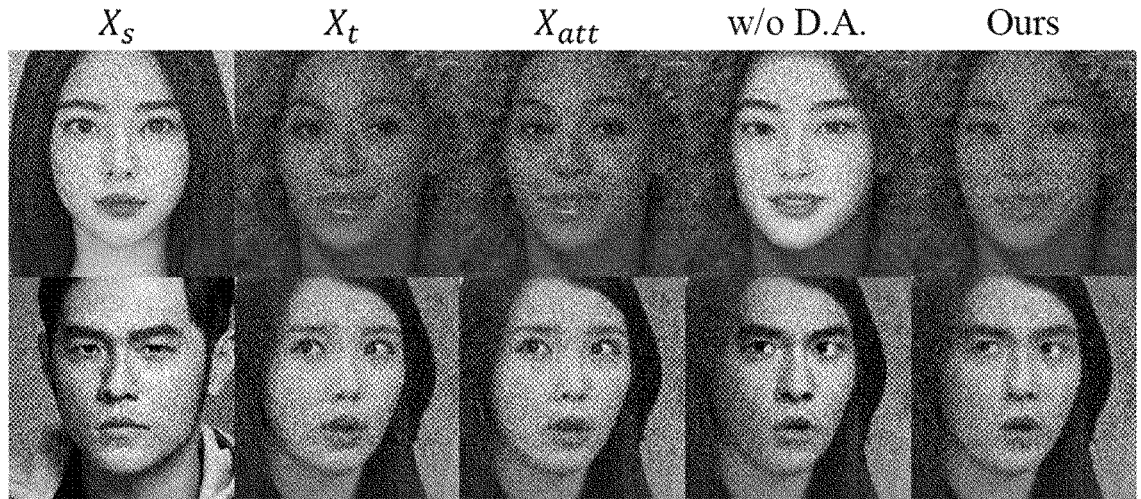
FIG. 10 is a view to explain the effect of data augmentation of the framework of the present disclosure.

FIG. 10 is a view to explain the effect of data augmentation of the framework of the present disclosure. In FIG. 10, (a) illustrates a source image $X_s$, (b) illustrates a target image $X_t$, (c) illustrates an attribute image $X_{att}$, (d) illustrates a face-conversion image of a model that did not learn the data augmentation of the present disclosure, and (e) illustrates a face-conversion image Y of a model that learned the data augmentation of the present disclosure. Even though the target image $X_t$ is input as the attribute image $X_{att}$ by using switch-test strategy, the model that did not learn the data augmentation follows the attributes of the source image $X_s$. This is because the model that did not learn the data augmentation is trained on the attributes of the source image $X_s$. Since the model that did not learn the data augmentation extracts identities and attributes from the source image $X_s$ and extracts poses from the target image $X_t$, the attribute image $X_{att}$ is meaningless. The data augmentation of the present disclosure enables the framework of the present disclosure to easily extract an identity feature, a pose feature and an attribute feature from the source image $X_s$, the target image $X_t$, and the attribute image $X_{att}$, respectively, during the learning process.

Figure 11:
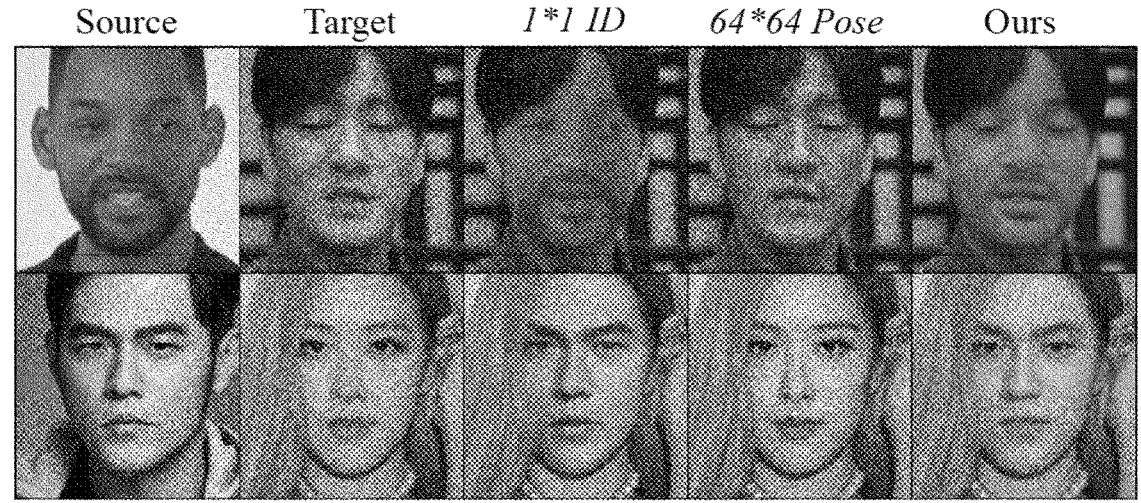
FIG. 11 illustrates a result when the depth design of the framework of the present disclosure is changed.

FIG. 11 illustrates a result when the depth design of the framework of the present disclosure is changed. The 1*1 ID and 64*64 pose of FIG. 11 respectively mean a deep identity encoder model (N=8) ($z_{s,in} \in R^{128 \times 1 \times 1}$) and the pose network ($z_{t,c} \in R^{128 \times 64 \times 64}$) that downsamples the target image $X_t$ only twice. The 1*1 ID shows extreme pose and attribute loss, which leads to low-fidelity conversion results. The 64*64 Pose completely reconstructs a target face. It can be seen that reducing the target code $z_{t,c}$ to a spatial resolution of 1×1 helps the framework of the present disclosure to extract poses, but not identities, from the target image. It can be seen that the (shallow) identity encoder 210 of the present disclosure improves identity details from the source image $X_s$ by minimizing the loss of a spatial feature size, and it can be seen that the (deep) pose network 230 of the present disclosure prevents identity leakage from the target image $X_t$, thereby inducing the pose and code activation functions P and C to focus on pose integration.

Figure 12:
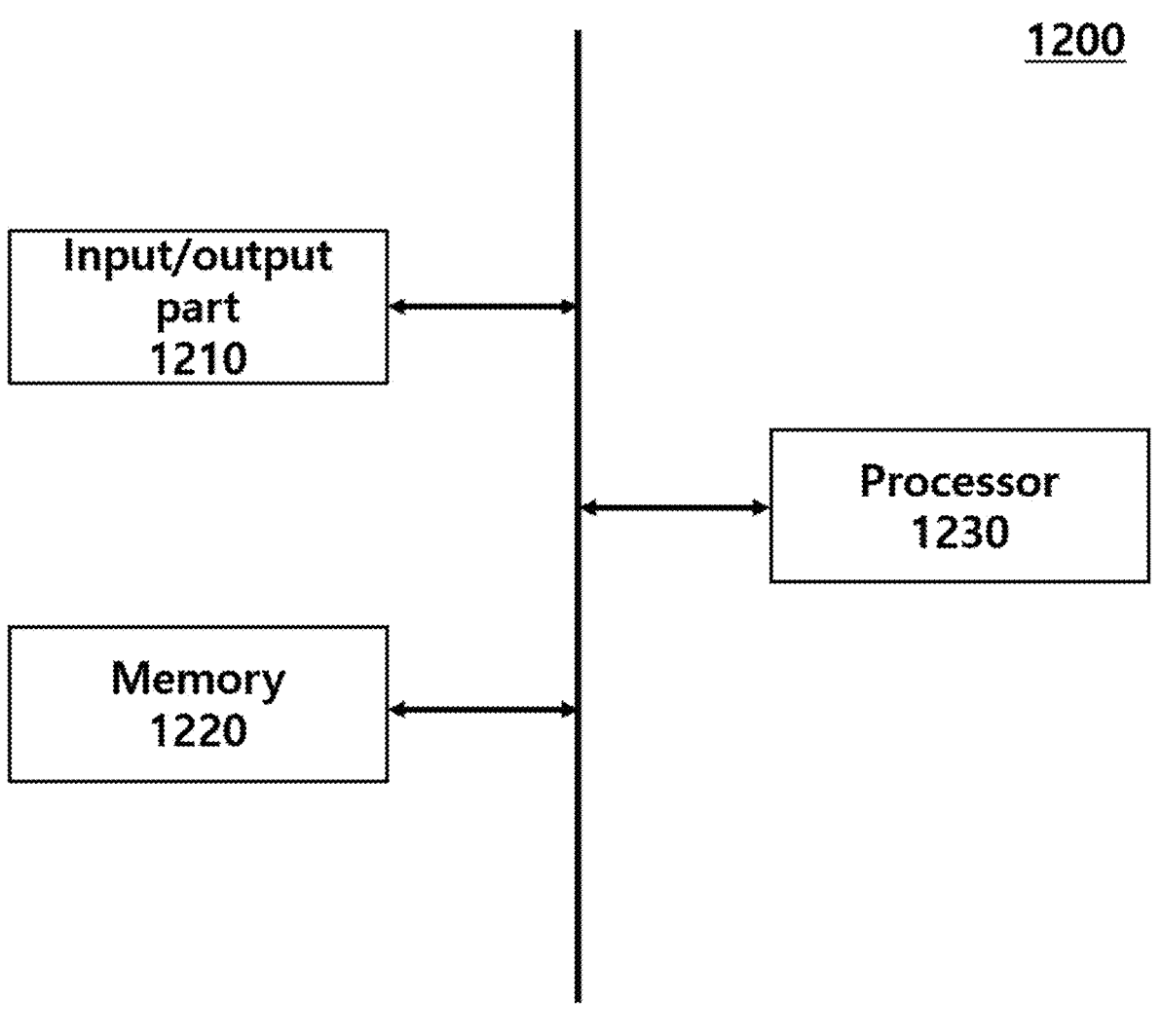
FIG. 12 illustrates a configuration of an image processing device according to an embodiment of the present disclosure.

FIG. 12 illustrates a configuration of the image processing device according to an embodiment of the present disclosure. Referring to FIG. 12, the image processing device 1200 includes an input/output part 1210, a memory 1220, and a processor 1230. The image processing device 1200 is a device that obtains a face-conversion image by utilizing the face swapping framework 200 and may include a server and a device of a user (e.g., a mobile phone, a computer, etc.).

The input/output part 1210 may be connected to an external device (e.g., a personal computer or a network) to exchange data. The source image $X_s$ and the target image $X_t$ may be input to the image processing device 1200 through the input/output part 1210.

The memory 1220 may store information related to an image processing method or a program implementing the image processing method as described above, that is, the face swapping framework 200. The memory 1220 may be volatile memory or non-volatile memory.

The processor 1230 may control the overall operation of the image processing device 1200 to enable the aforementioned program, the face swapping framework 200, to be executed. More specifically, the processor 1230 may cause the source image $X_s$ and the target image $X_t$ to undergo data augmentation in the training phase, use the source image $X_s$ having an adjusted size as the attribute image $X_{att}$, and use the target image $X_t$ having an adjusted size as the attribute image $X_{att}$ in the testing phase.

In addition, the processor 1230 extracts an identity feature, a pose feature, and a target code for each of the source image $X_s$ and the target image $X_t$, and obtains an identity activation function, a pose activation function, and a code activation function for each of the identity feature, the pose feature, and the target code which are extracted, and uses each of the identity activation function, pose activation function, and code activation function obtained as a result of computation to generate output images having the pose features of the target image $X_t$ and the attribute features of the attribute image $X_{att}$ while maintaining the identity features of the source image $X_s$.

Although the present disclosure has been described in detail through representative embodiments above, those skilled in the art to which the present disclosure belongs will understand that various modifications are possible with respect to the above-described embodiments without departing from the scope of the present disclosure. Therefore, the scope of the rights of the present disclosure should not be limited to the described embodiments, but should be determined by all changes or modifications derived from concepts equivalent to the claims as well as the claims described below.

The invention claimed is:

1. An image processing device comprising:
   a processor configured to execute a face swapping framework;
   a memory configured to store the face swapping framework,
   wherein the face swapping framework comprises:
   an identity encoder configured to encode a source image so as to extract an identity feature;

a pose network configured to encode a target image so as to extract a target code and to decode the target code so as to extract a pose feature; and a triple adaptive normalization (TAN) decoder configured to integrate the identify feature, the target code and the pose feature and to use an attribute image in which a size of the target image has been adjusted so as to generate a face-conversion image in which an attribute feature of the target image is reflected, wherein the TAN decoder comprises a plurality of TAN blocks, wherein each of the plurality of TAN blocks comprises:

an identity integration block configured to produce a result of an identity activation function corresponding to the identity feature;

a spatial-adaptive pose integration block configured to produce a result of a pose activation function corresponding to the pose feature; and a non-spatial-adaptive pose integration block configured to produce a result of a code activation function corresponding to the target code.

2. The image processing device of claim 1, wherein the TAN block comprises a spatial-adaptive branch and a non-spatial-adaptive branch in a parallel form, wherein the spatial-adaptive pose integration block and the identity integration block are arranged in series in sequence in the spatial-adaptive branch, and the non-spatial-adaptive pose integration block is arranged in the non-spatial-adaptive branch.

3. The image processing device of claim 1, wherein the face swapping framework performs data augmentation by color distortion on the source image and the target image in a training phase of the face swapping framework.

4. The image processing device of claim 1, wherein in a training phase of the face swapping framework, the source image having an adjusted size is input as the attribute image, and in a testing phase of the face swapping framework, the target image having an adjusted size is input as the attribute image.

* * * * *